United States Patent
Carbune et al.

(10) Patent No.: US 11,574,640 B2
(45) Date of Patent: Feb. 7, 2023

(54) USER-ASSIGNED CUSTOM ASSISTANT RESPONSES TO QUERIES BEING SUBMITTED BY ANOTHER USER

(71) Applicant: Google LLC, Mountain View, CA (US)

(72) Inventors: Victor Carbune, Zurich (CH); Matthew Sharifi, Kilchberg (CH)

(73) Assignee: Google LLC, Mountain View, CA (US)

( * ) Notice: Subject to any disclaimer, the term of this patent is extended or adjusted under 35 U.S.C. 154(b) by 310 days.

(21) Appl. No.: 16/946,952

(22) Filed: Jul. 13, 2020

(65) Prior Publication Data
US 2022/0013129 A1    Jan. 13, 2022

(51) Int. Cl.
| G10L 17/06 | (2013.01) |
| G06V 20/00 | (2022.01) |
| G06F 3/16 | (2006.01) |
| H04L 51/02 | (2022.01) |
| G10L 17/00 | (2013.01) |

(52) U.S. Cl.
CPC .............. *G10L 17/06* (2013.01); *G06F 3/167* (2013.01); *G06V 20/00* (2022.01); *H04L 51/02* (2013.01); *G10L 17/00* (2013.01)

(58) Field of Classification Search
CPC ......... G10L 17/06; G10L 17/00; G06F 3/167; G06V 20/00; H04L 51/02
USPC .......................................................... 704/246
See application file for complete search history.

(56) References Cited

U.S. PATENT DOCUMENTS

| 10,600,097 | B2* | 3/2020 | Angell | H04L 51/02 |
| 10,984,782 | B2* | 4/2021 | Finkelstein | G10L 15/32 |
| 2017/0025124 | A1* | 1/2017 | Mixter | G10L 15/32 |
| 2018/0005289 | A1* | 1/2018 | Angell | G06Q 30/0613 |
| 2018/0233132 | A1* | 8/2018 | Herold | H04W 4/029 |
| 2018/0233139 | A1* | 8/2018 | Finkelstein | G06V 40/166 |
| 2022/0013129 | A1* | 1/2022 | Carbune | H04L 51/02 |

* cited by examiner

*Primary Examiner* — Edwin S Leland, III
(74) *Attorney, Agent, or Firm* — Gray Ice Higdon

(57) ABSTRACT

Implementations set forth herein relate to an automated assistant that can be customized by a user to provide custom assistant responses to certain assistant queries, which may originate from other users. The user can establish certain custom assistant responses by providing an assistant response request to the automated assistant and/or responding to a request from the automated assistant to establish a particular custom assistant response. In some instances, a user can elect to establish a custom assistant response when the user determines or acknowledges that certain common queries are being submitted to the automated assistant—but the automated assistant is unable to resolve the common query. Establishing such custom assistant responses can therefore condense interactions between other users and the automated assistant. Furthermore, as such interactions are more immediately resolved, the automated assistant can avoid wasteful consumption of computational resources that may otherwise occur during prolonged assistant interactions.

14 Claims, 11 Drawing Sheets

USER-ASSIGNED CUSTOM ASSISTANT RESPONSES TO QUERIES BEING SUBMITTED BY ANOTHER USER

BACKGROUND

Humans may engage in human-to-computer dialogs with interactive software applications referred to herein as "automated assistants" (also referred to as "digital agents," "chatbots," "interactive personal assistants," "intelligent personal assistants," "conversational agents," etc.). For example, humans (which when they interact with automated assistants may be referred to as "users") may provide commands and/or requests using spoken natural language input (i.e., utterances) which may in some cases be converted into text and then processed, and/or by providing textual (e.g., typed) natural language input.

In some instances, interactions between a user and an automated assistant can result in the automated assistant promptly answering certain queries but being unable to adequately fulfill other queries. When the automated assistant is unable to adequately fulfill certain queries, the automated assistant may unnecessarily prolong an interaction in order to provide a suitable response—which may or may not be available to the automated assistant. For example, certain queries can be sincerely provided by a user with the expectation of receiving a useful response—but may ultimately result in an interaction that unnecessarily consumes computational resources. This issue can be particularly concerning for queries that are common among a large population of users, such as when children across various households inquire about their bedtime (e.g., "Assistant, when is my bedtime?"). For instance, in response to the query regarding bedtime for a child, the automated assistant may indicate that the query could not be resolved (e.g., "I'm sorry, I'm not sure . . . ") and offer other similar queries for the child to provide (e.g., " . . . but you can ask me to play relaxing music by saying 'Assistant, I'm going to bed.'"). Although these engagements have utility in certain situations, such responses can unnecessarily prolong interactions that were initially intended to be brief.

In some scenarios, a user may not be able to engage with another member of their household because they have other tasks to attend to in order to ensure their home is being safely managed. For instance, a user may not be able to always remind their child to finish their homework before the child accesses a game application—especially when the user is cooking or video conferencing, and therefore momentarily unable to view the child. Should the user pause an ongoing task, such as cooking or video conferencing, the task may be prolonged, thereby leading to an increase in consumption of resources such as power, network bandwidth, and/or other resources.

SUMMARY

Implementations set forth herein relate to an automated assistant that can receive custom assistant response requests from a first user in order to cause the automated assistant to provide custom responses to a second user. The first user can establish such custom responses for the automated assistant in order to mitigate length and/or frequency of interactions between certain users and the automated assistant, and/or make more efficient use of the automated assistant. For instance, the first user can be a homeowner that allows guests to stay at their home, and the second user can be any guest that temporarily resides in the home of the first user. The first user can provide a custom assistant response request to the automated assistant in order to cause the automated assistant to provide a custom response to the second user when one or more conditions are satisfied.

For example, the assistant response request can be, "Assistant, when someone asks when I wake up, please tell them '6:30 AM.'" In response to receiving this request, the automated assistant can generate condition data characterizing one or more assistant response conditions that should be satisfied in order for the automated assistant to indicate a "wake up" time specified by the first user. Assistant response conditions can be, for example, (i) a voice input provided by a second user that is different from the first user, and (ii) the voice input embodying an inquiry regarding when the first user wakes up. Therefore, when a second user provides a voice input to the automated assistant and the voice input includes an inquiry regarding a wake up time for the first user (e.g., "Assistant, when does Charles usually wake up?"), the automated assistant can respond with the custom response specified by the first user (i.e., "Charles"). In other words, in response to the inquiry from the second user, the automated assistant can respond, "Charles wakes up at 6:30 AM."

In some implementations, a first user can request that a custom response be provided to a second user when one or more assistant response conditions are satisfied—and at least one of the assistant response conditions can be a non-verbal activity of the second user. For example, the first user can provide an assistant response request such as, "Assistant, when [the second user] finishes eating, please ask them if they have finished their homework." In response to the assistant response request, the automated assistant and/or other application can generate condition data that is based on the assistant response request. The condition data can characterize a condition that is satisfied when the second user ceases a non-verbal activity of eating (e.g., walking away from a table after eating a sandwich at the same table). Therefore, after receiving the assistant response request, the automated assistant can determine, with prior permission from the second user, whether the second user is eating by processing certain image data.

When the automated assistant determines that the second user is no longer eating, the automated assistant can provide the custom query, "Did you finish your homework?" In this way, when the first user is involved in a task that conflicts with their ability to provide this custom query to the second user, the automated assistant can provide the custom query without interrupting the task. This can be particularly useful in contexts where the first user is involved in a task that may need their complete attention (e.g., cooking with hot oil, repairing a vehicle, participating in a video conference, meeting with a contractor regarding home repairs). Moreover, this can preserve resources that might otherwise be wasted when a user interrupts their ongoing task to make certain inquiries to other persons.

In some implementations, the automated assistant can share a response that a user provides when the user receives a custom response from the automated assistant. For instance, a first user can request that such a response be shared with the first user in response to one or more assistant response conditions being satisfied. As one example, the first user can provide an assistant response request such as, "Assistant, when [the second user] finishes eating, please ask them if they have finished their homework and then let me know what they say." In response, the automated assistant can determine when the second user is eating and, when the second user ceases eating, the automated assistant can render an output such as, "Have you finished your homework?".

In some implementations, the output can be rendered in a default voice for the automated assistant, a character voice that the second user is familiar with (e.g., the cartoon character Popeye), a user voice that mimics a voice of the first user (with prior permission from the first user), and/or any other voice output. The second user can provide a response such as, "Not yet," which can be recorded by the automated assistant with prior permission from the second user. Audio data characterizing the response from the second user can be stored and accessible to the automated assistant. In this way, when the first user is subsequently available to interact with the automated assistant, the automated assistant can render audio and/or graphical user interface data such as, "[The second user] says 'Not yet.'" This allows the first user to exert more attention toward their current task and preserves resources that may otherwise be consumed when a user is not relying on their automated assistant to handle comparable tasks.

In some implementations, the automated assistant can proactively prompt a first user regarding setting up a custom response for certain assistant queries that are commonly provided by second users that interact with an automated assistant that is associated with the first user. Put another way, the proactive prompting by the automated assistant, for a custom response for a given assistant query (or a collection of semantically similar assistant queries) can be responsive to determining that the given assistant query (or collection of semantically similar assistant queries) has been provided by user(s) a threshold quantity of times and/or with a threshold frequency. In these and other manners, the automated assistant can prompt for a custom response when it is determined, using the threshold quantity and/or the threshold frequency as a proxy, that doing so and receiving a custom response will result in meaningful computational resource and/or network resource savings. For example, when the threshold quantity and/or the threshold frequency are satisfied, it can be determined that the computational and/or network resources utilized in prompting for the custom response will be far outweighed by the resource savings achieved through having the custom response for the given assistant query and/or collection of semantically similar assistant queries. For instance, by having the custom response, future occurrences of the query or semantical similar queries can be responded to with the custom response. However, absent the custom response, a default or non-responsive response would be provided for such future occurrences and, for at least some users, those users would follow-up with another spoken utterance that seeks a responsive response—thereby prolonging the user/assistant interaction and unduly consuming computational and/or network resources.

As one particular example, the first user can be a business owner that operates a store that allows public guests to interact with an automated assistant inside of the store. The automated assistant can be responsive to user queries that relate to internet searches, product information, and/or other data that can be available to the automated assistant. However, some queries may have answers that are not available to the automated assistant because the first user has not made the answers available to the public. For example, the first user may be working on a delivery option for certain products within their store, but may not have unveiled this option to the public yet. Regardless, secondary users that enter the store may commonly ask the automated assistant, "When will delivery be available for these products?" Initially, the automated assistant may not have settings and/or other data that allow the automated assistant to respond accurately. For example, initially the automated assistant can respond by saying, "I'm not sure I can assist with answering that query." Over time, when the automated assistant acknowledges that this is a common query from store guests, the automated assistant can prompt the first user regarding whether the first user would like to set up a custom response for this common query.

The prompt from the automated assistant can be, "There have been multiple queries regarding 'product delivery.' Would you like to create a custom response for such queries?" In response, the first user can provide a spoken utterance such as, "Yes, please tell them that a delivery option will be available in six months." In response to the spoken utterance, the automated assistant can generate condition data and/or assistant response data, which can allow the automated assistant to be responsive to certain guests when certain conditions are satisfied. For example, subsequent to the first user providing the spoken utterance, a second user can enter the store and provide a particular query to the automated assistant such as, "Assistant, will there be a delivery option available soon?" In response, the automated assistant can determine that this particular query from the second user satisfies a subject matter condition, corresponding to "delivery option" being a subject of the query. Alternatively, or additionally, the automated assistant can determine that this particular query from the second user satisfies a user identification condition, which can correspond to a user that is separate from the first user providing the particular query. Therefore, because the conditions are satisfied, the automated assistant can provide the custom response established by the first user (e.g., "A delivery option will be available in 6 months.").

In some implementations, the custom response can be adapted to a particular context, and/or a particular query from the second user. For example, the automated assistant can provide an output that indicates an amount of time remaining until the "delivery option" is available—rather than reciting the verbatim custom response (e.g., "6 months") set forth by the first user. In other words, when a second user provides a query about the delivery option 2 months from when the first user established the custom response, the automated assistant can respond to the query according to a current context. For example, the automated assistant can determine an amount of time that has transpired since the first user created the custom assistant response, and use this amount of time for providing a responsive output such as, "The delivery option will be available in about 4 months." In this way, the automated assistant can logically adapt custom responses according to a context in which one or more users provide queries that invoke custom responses.

In some implementations, creation of custom assistant responses can be limited by permission data, which can indicate the circumstances in which certain custom assistant responses can be created. For example, permission data can indicate that a first user is permitted, or not permitted, to create custom assistant responses for assistant queries submitted by a second user. Alternatively, or additionally, other permission data can indicate that a first user is permitted, or not permitted, to create custom assistant responses for queries that embody certain subject matter. For example, a first user can modify the permission data such that no user can create a custom assistant response for any assistant queries that embody subject matter that involves calendar events from a calendar of a first user. In some implementations, certain permissions can be enforceable as a default but can be modifiable by certain users with administrative privileges.

The above description is provided as an overview of some implementations of the present disclosure. Further description of those implementations, and other implementations, are described in more detail below.

Other implementations may include a non-transitory computer readable storage medium storing instructions executable by one or more processors (e.g., central processing unit(s) (CPU(s)), graphics processing unit(s) (GPU(s)), and/or tensor processing unit(s) (TPU(s)) to perform a method such as one or more of the methods described above and/or elsewhere herein. Yet other implementations may include a system of one or more computers that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1A:
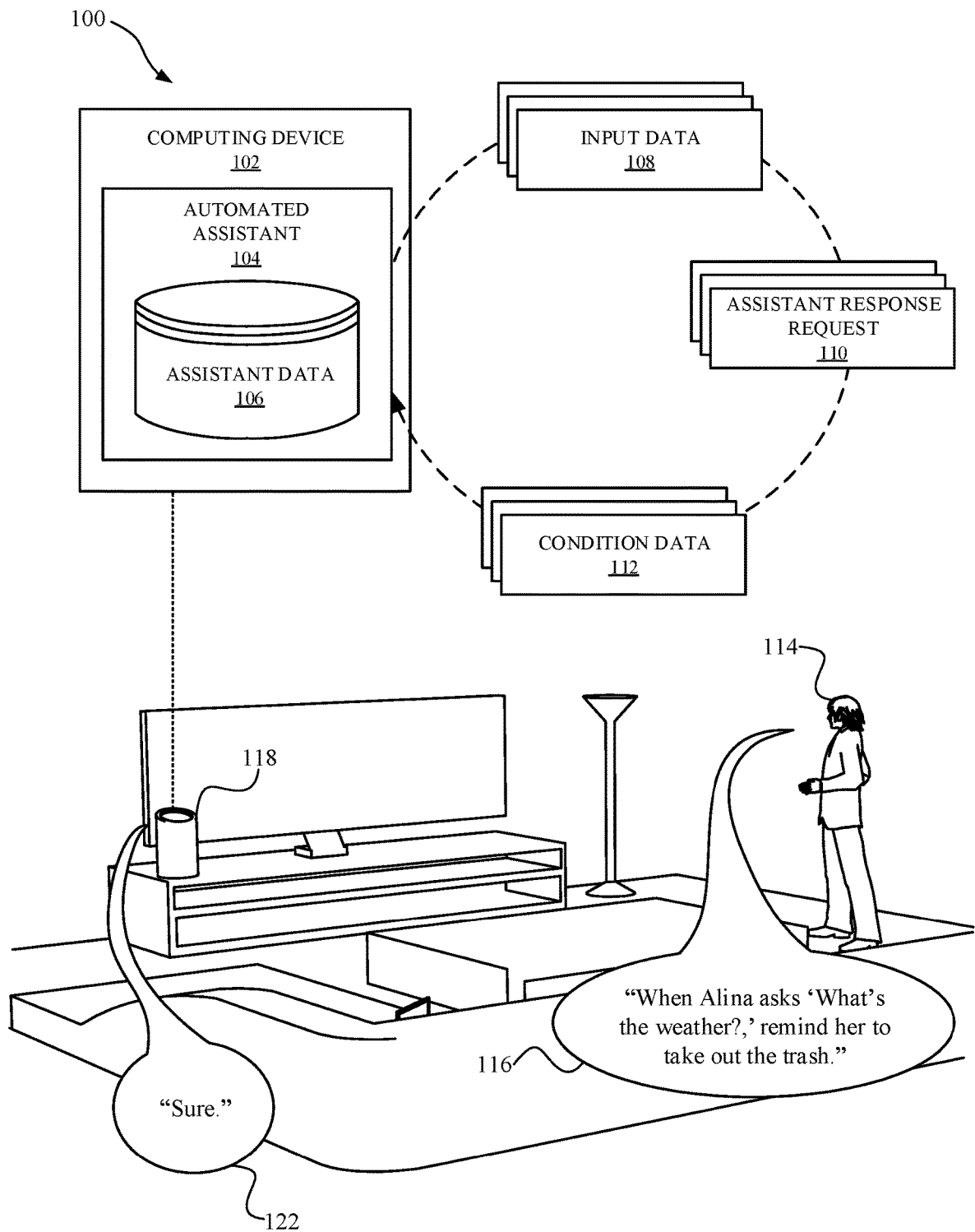
FIG. 1A and FIG. 1B illustrate views of a user creating a custom assistant response for rendering to another user when one or more conditions are satisfied.
Figure 1B:
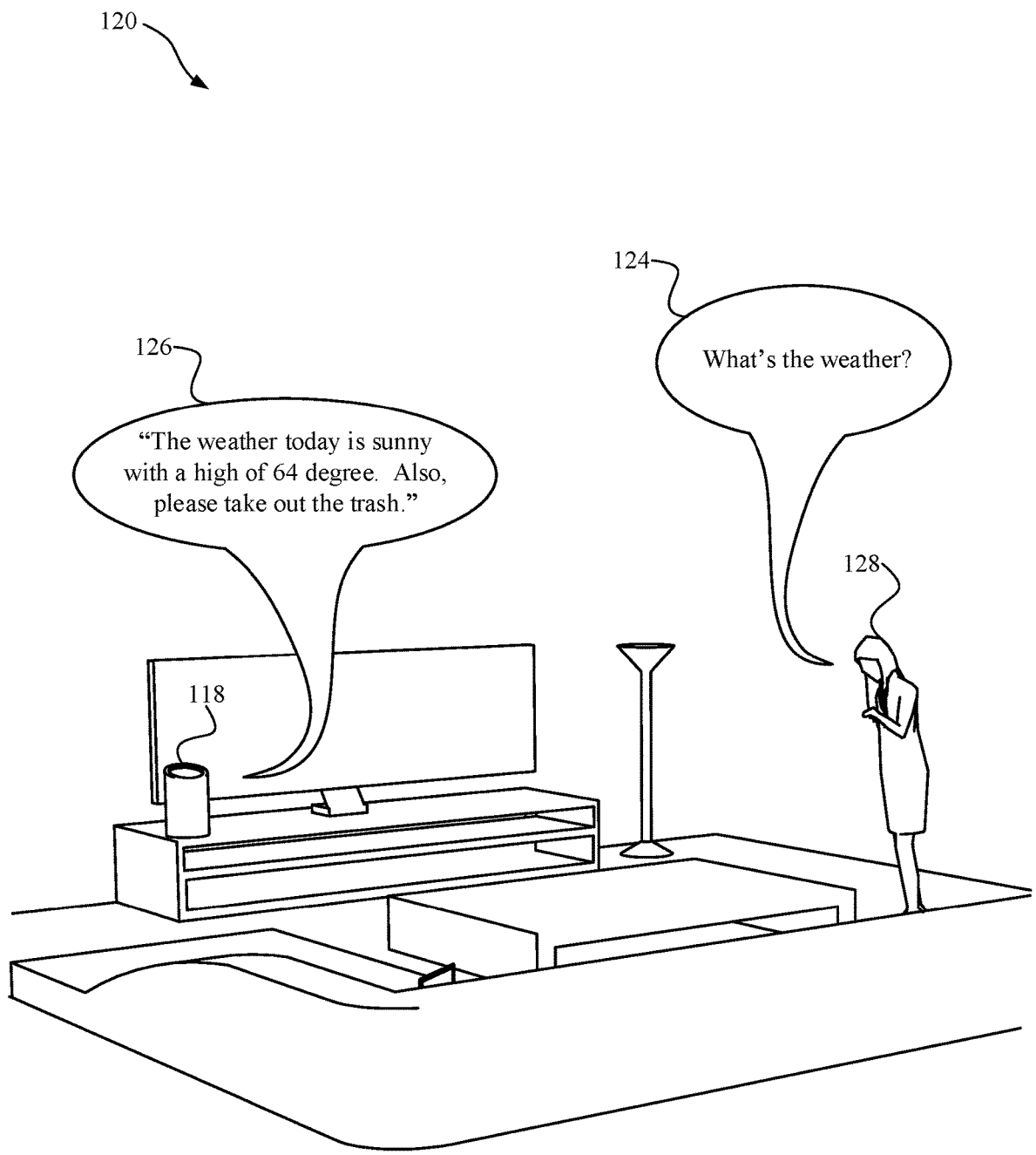

FIG. 1A and FIG. 1B illustrate a view 100 and a view 120 of a user 114 creating a custom assistant response for another user 128. A custom assistant response results from the user 114 interacting with a computing device 102 that provides access to automated assistant 104. For example, the user 114 can provide a spoken utterance 116 to the computing device 102, which can be a stand-alone assistant device 118, in order for the automated assistant 104 to create the custom assistant response. For instance, the spoken utterance 116 can be, "When Alina asks 'What's the weather?', remind her to take out the trash." This request can be a reminder for another person that is in the house to perform a task in furtherance of improving the house. Furthermore, this reminder can operate according to certain conditions which, when satisfied, can be optimal for presenting certain reminders. The spoken utterance 116 from the user 114, and/or a context in which the user 114 provided the spoken utterance 116, can be a basis for the one or more conditions.

In response to receiving the spoken utterance 116, the automated assistant 104 can process input data 108 that characterizes the spoken utterance 116. The automated assistant 104 can determine, based on processing the input data, that the spoken utterance 116 embodies an assistant response request 110. Specifically, the assistant response request 110 can correspond to a request from the user 114 to provide a natural language output (e.g., "Take out the trash") in response to another spoken utterance (e.g., "What's the weather?") from the other user 128. The automated assistant 104 can generate condition data 112 that characterizes one or more conditions that should be satisfied in order for the automated assistant 104 to provide the natural language output. For example, the condition data 112 can characterize (i) subject matter that should be included in a spoken utterance and/or (ii) a voice signature of the other user 128. In this way, the subject matter (e.g., the weather) and the presence of the other user 128 (e.g., "Alina") are conditions for rendering the natural language output. In other words, the natural language output specified by the user 114 will be provided when a particular user provides an input that embodies certain subject matter.

As an example, and as provided in view 120 FIG. 1B, the other user 128 can provide a spoken utterance 124 such as, "What's the weather?" to the standalone computing device 118, which provides access to the automated assistant 104. In response, the automated assistant 104 can determine whether one or more conditions, for providing the natural language output specified by the user 114, have been satisfied. Based on determining that the one or more conditions have been satisfied, the automated assistant 104 can cause the stand-alone computing device 118 to provide a natural language output such as, "The weather today is sunny with a high of 64 degrees. Also, please take out the trash." In some implementations, the automated assistant 104 can provide a response to an initial query embodied in the spoken utterance 124 before or after rendering the custom assistant response specified by the user 114. In some implementations, the automated assistant can include, in the natural language output 126, an indication of who established the custom assistant response and/or identify the portion of the natural language output 126 that corresponds to the custom assistant response.

Figure 2A:
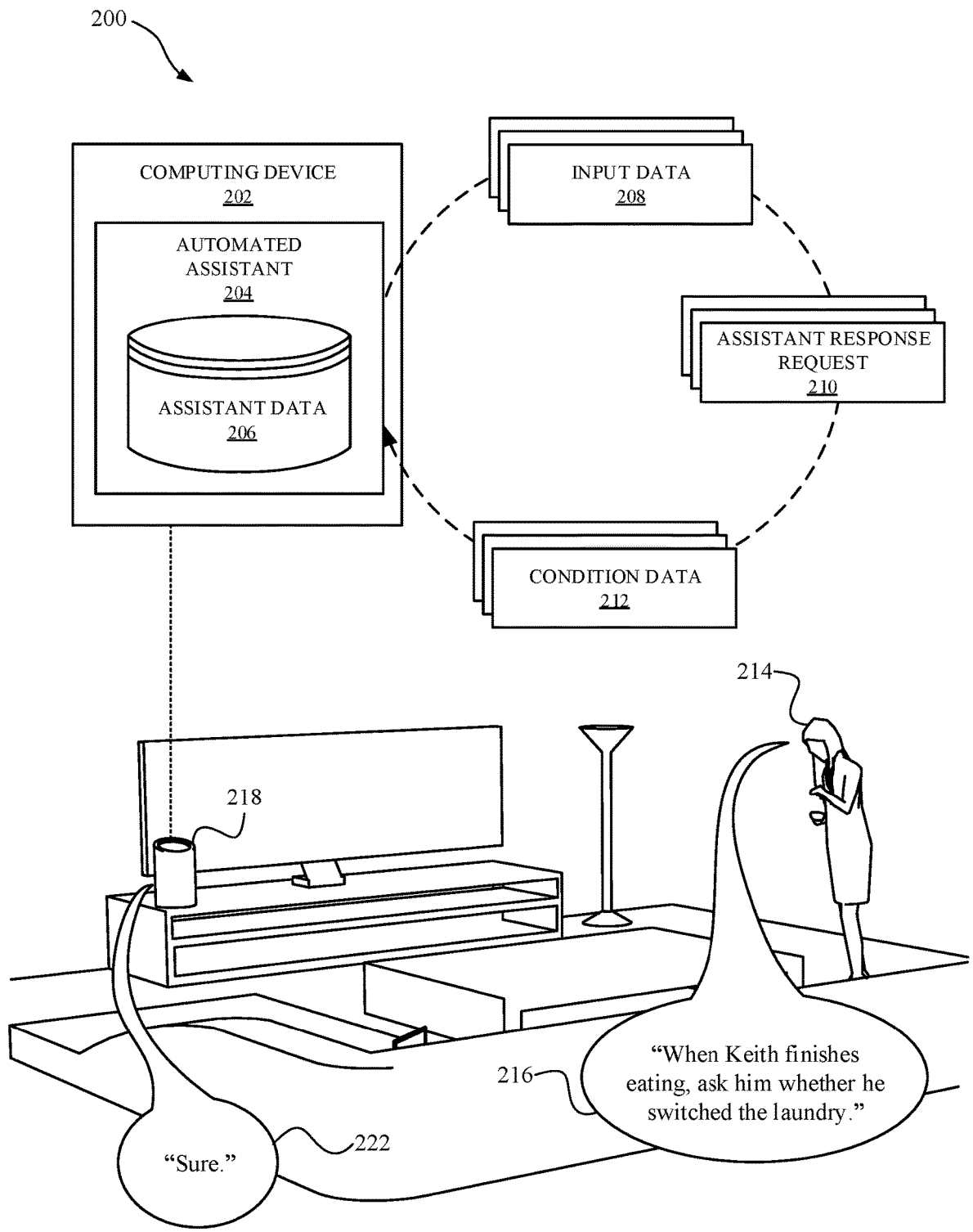
FIG. 2A, FIG. 2B, and FIG. 2C illustrate views of a user establishing a custom assistant response that can be used for two-way communications and/or reminders via an automated assistant.
Figure 2B:
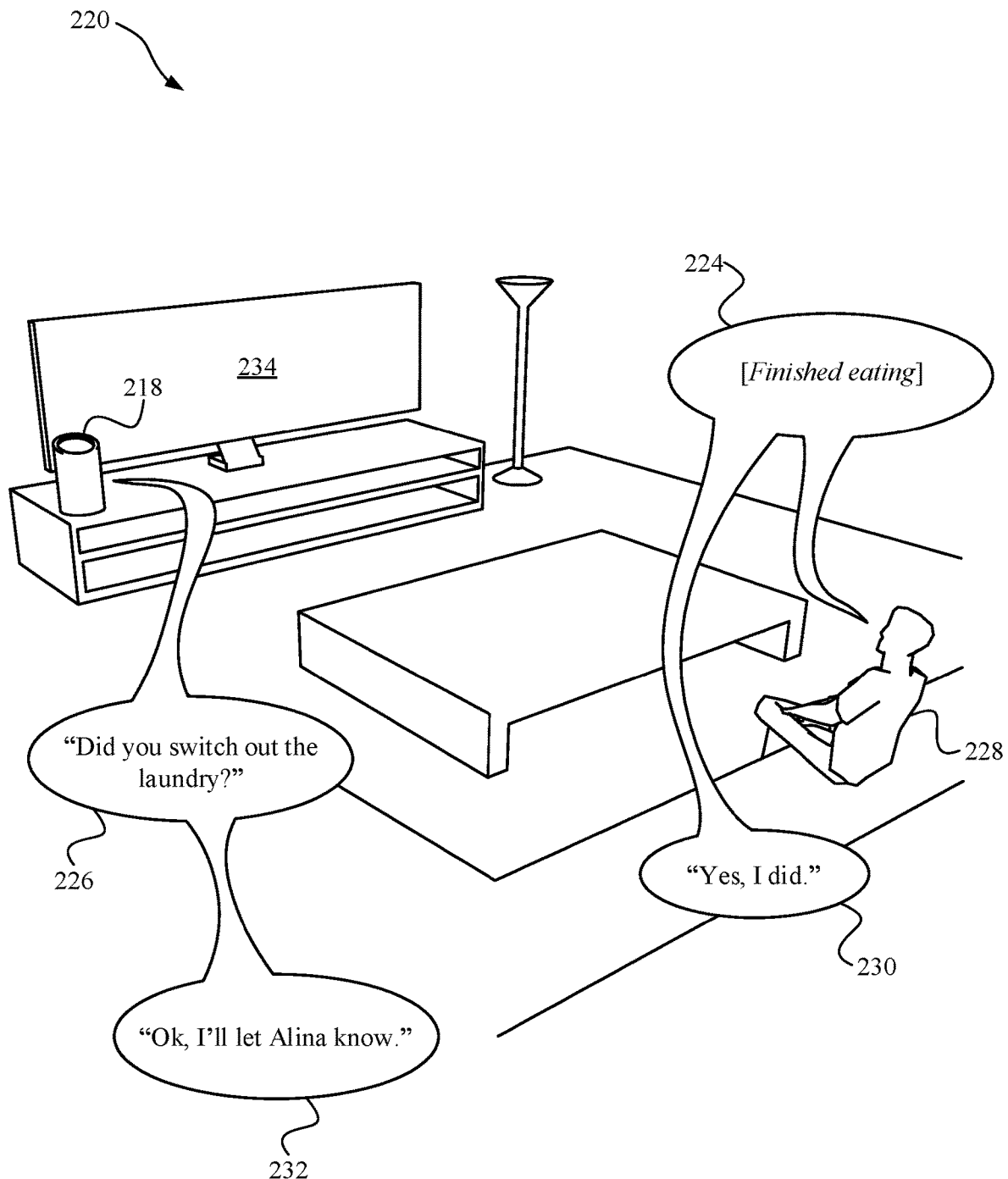
Figure 2C:

FIG. 2A, FIG. 2B, and FIG. 2C illustrate a view 200, a view 220, and a view 240 of a user 214 establishing a custom assistant response that can be used for two-way communications and/or reminders via an automated assistant 204. For example, the user 214 can provide a spoken utterance 216 to a computing device 202, which provides access to the automated assistant 204. The spoken utterance 216 can be for example, "When Keith finishes eating, ask him whether he switched the laundry." In response to receiving the spoken utterance 216, the automated assistant 204 can process input data 208 characterizing the spoken utterance 216. Based on this processing, the automated assistant 204 can determine that the spoken utterance 216 includes an assistant response request 210. Furthermore, the automated assistant 204 can generate condition data 212 that characterizes one or more conditions (e.g., a contextual condition, non-verbal activity, voice signature, etc.) that should be satisfied in order for the automated assistant 204 to provide a custom assistant response to another user 228. Furthermore, the automated assistant 204 can generate assistant data 206, which can characterize the process in which the automated assistant (i) provides the custom assistant response to the other user 228, (ii) determines whether the other user 228 replied to the custom assistant response, and then (iii) shares the reply with the user 214. When the automated assistant 204 successfully processes the assistant response request 210, the automated assistant 204 can provide an output 222 via a computing device 202, such as a stand-alone computer device 218.

Subsequent to the user 214 providing the spoken utterance, the automated assistant 204 can determine that the other user 228 had begun to eat a meal and then subsequently finished, as indicated by status 224. This status determination can be based on data from one or more sensors, and with prior permission from the other user 228. For example, the stand-alone computing device 218 and/or another computing device 234 can include a camera, which can detect a status of one or more users, with prior permission from the one or more users. Based on the status 224, the automated assistant 204 can determine that one or more conditions associated with the custom assistant response have been satisfied.

Based on the one or more conditions being satisfied, the automated assistant 204 can cause the stand-alone computing device 218 and/or the other computing device 234 to provide a natural language output. The natural language output can be, for example, "Did you switch out the laundry?", as indicated by output 226. In response, the other user 228 can provide a natural language input 230 to the automated assistant 204 by speaking a natural language phrase such as, "Yes, I did." In response to this natural language input from the other user 228, the automated assistant 204 can process the natural language input 230 in order to generate additional assistant data that characterizes information to be communicated to the user 214. Alternatively, or additionally, the automated assistant 204 can provide a response 232 such as, "Ok, I'll let Alina know," via an interface of the standalone computing device 218 and/or the other computing device 234.

In some implementations, and as indicated by view 240 of FIG. 2C, the automated assistant 204 can cause an interface of another device 246, such as a display device, to render an audible output based on the natural language input 230 from the other user 228. For example, the other device 246 and the computing device 218 can be located in a home 238 of the user 214 and the other user 228. The computing device 218 and the other device 246 can communicate over a network, such as a Wi-Fi network established at least in part by a Wi-Fi router 236. A natural language output 242 provided by the automated assistant 204 can be, for example, "Alina, Keith indicated that 'yes,' he did switch the laundry," to which the user 214 can provide an acknowledging response 244, "Thank you." Alternatively, or additionally, the automated assistant 204 can render recorded audio characterizing at least a portion of the natural language input 230 provided by the other user 228, with prior permission from the other user 228.

This custom assistant response can be rendered by the automated assistant 204 to the user 214 when one or more other conditions are satisfied. In some implementations, the natural language output 242 can be provided to the user 214 in response to the other user 228 providing the natural language input 230. Alternatively, or additionally, the natural language output 242 can be provided to the user 214 in response to the user 214 coming within a threshold distance of an assistant enabled device. Alternatively, or additionally, the natural language output 242 can be provided to the user 214 when the other user 228 directs the automated assistant 204 to provide the natural language output 242 to the user 214. For example, the automated assistant 204 can receive the natural language input 230 from the other user 228, and then follow up with another assistant query such as, "When would you like me to tell Alina your response?" In response, the other user 228 can provide another natural language input such as, "You can tell her in an hour," thereby causing the automated assistant 204 to establish a notification for providing the response from the other user 228 to the user 214 at a particular time specified by the other user 228. As a result, this two-way communication effectuated by the automated assistant 204 can mitigate opportunities for messages between users to be overlooked. Rather, the two-way communications between the users can be executed according to certain conditions, as determined by those users and/or the automated assistant 204.

Figure 3A:
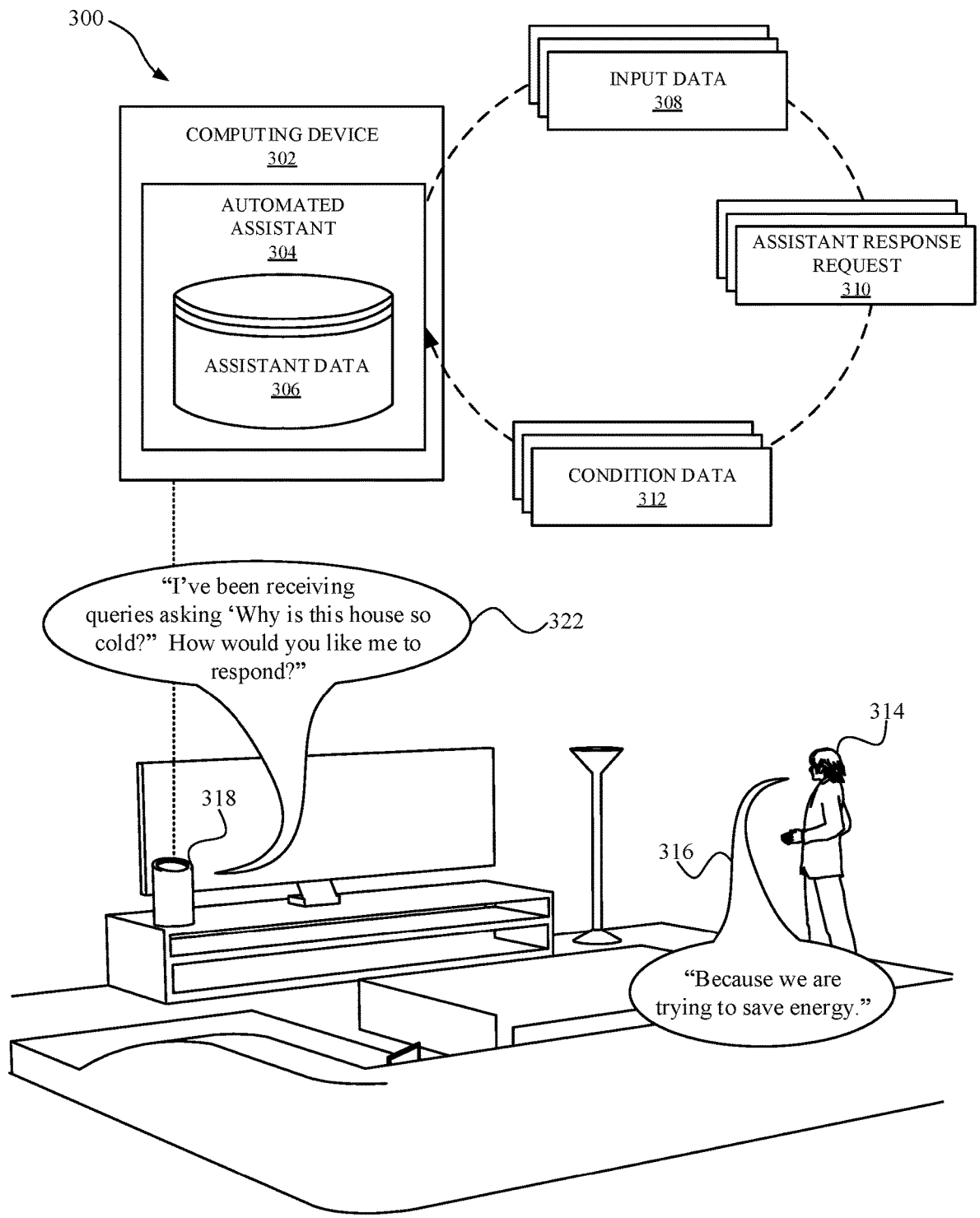
FIG. 3A and FIG. 3B illustrate views of a user being prompted to establish a custom assistant response for an assistant query that an automated assistant has not been pre-configured to resolve.
Figure 3B:
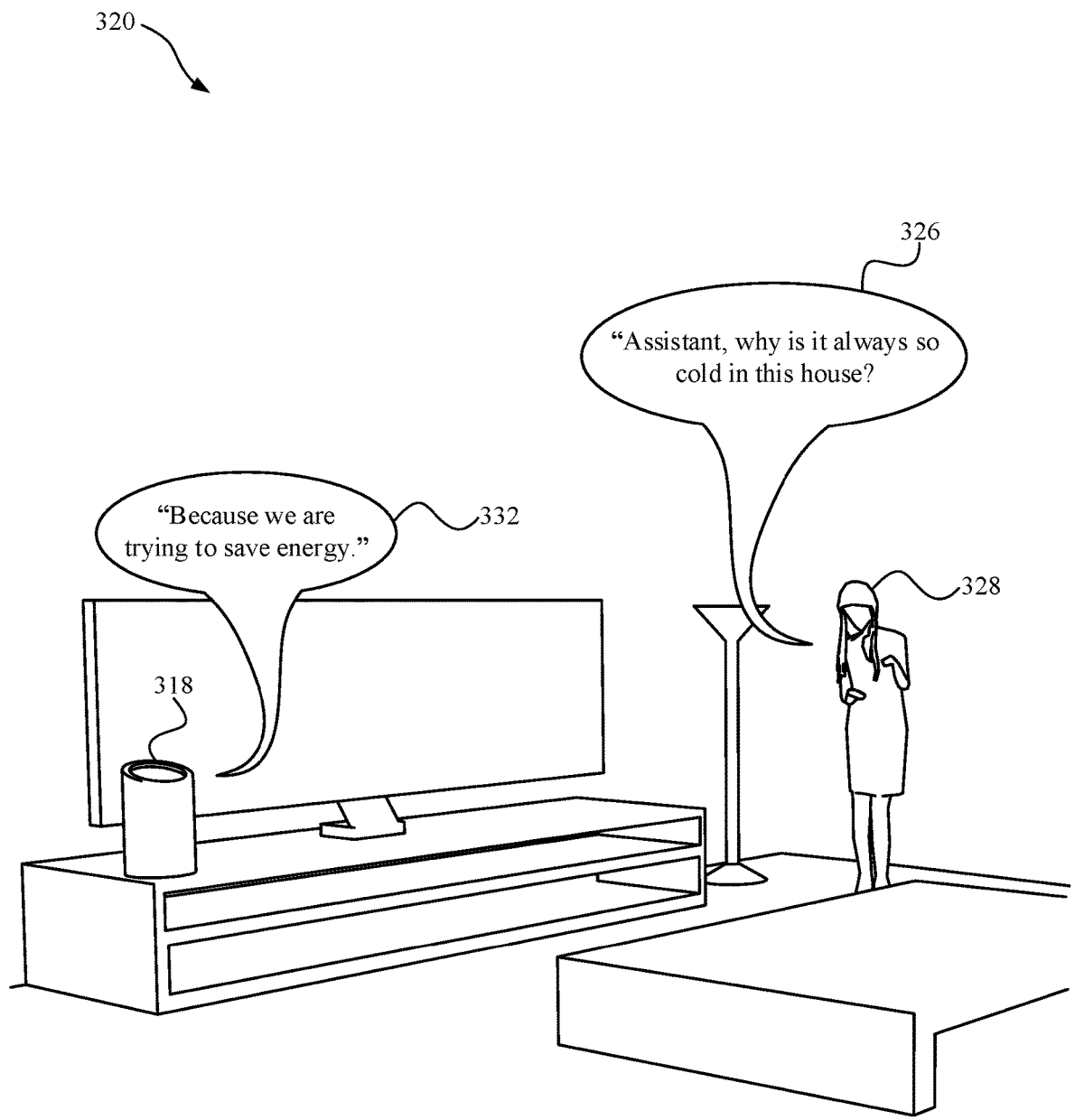

FIG. 3A and FIG. 3B illustrate a view 300 and a view 320 of a user 314 being prompted to establish a custom assistant response for an assistant query that an automated assistant 304 has not been pre-configured to resolve. For example, on one or more occasions, the automated assistant 304 can receive user queries that embody subject matter related to how cold a house is. For instance, various guests to a house of the user 314 may have asked the automated assistant a question such as, "Assistant, why is this house so cold?" This question may be posed by guests of the user 314, and the user 314 may be operating their home as a short term rental property. Therefore, each guest may be affected by settings that are controllable by the automated assistant 304. For example, the user 314 can include a computing device 302, such as a stand-alone computing device 318, and the stand-alone computing device 318 can provide access to the automated assistant 314.

When a user(s) that is different than the user 314 provides an assistant query to the automated assistant 304, the automated assistant 304 can determine whether the automated assistant 304 can resolve the assistant query with a particular response. When the automated assistant 304 determines that a response that would resolve the assistant query is not immediately available to the automated assistant 304, the automated assistant 304 can generate an assistant response request 310. For example, in response to input data 308 characterizing various instances in which users ask the automated assistant 304 about why the house is so cold, the automated assistant in 304 can generate the assistant response request 310. The assistant response request 310 can characterize a user query 322 that can be provided by the automated assistant 304 in order to solicit a response from the user 314 regarding the unresolved assistant query.

For example, based on the assistant response request 310, the automated assistant 304 can render a user query 322 such as, "I've been receiving queries asking 'why is this house so cold?' How would you like me to respond?" In response, the user 314 can provide a natural language input 316, such as "Because we are trying to save energy." Based on the natural language input 316 from the user 314, the automated assistant 304 can generate condition data 312 and/or assistant data 306. This generated data can characterize the custom assistant response, as well as one or more conditions that should be satisfied in order for the automated assistant 304 to provide the custom assistant response specified by the user 314.

Subsequently, and as illustrated in view 320 of FIG. 3B, another user 328 can provide a spoken utterance 326 such as, "Assistant, why is it always so cold in this house?" In response to receiving the spoken utterance 326, the automated assistant 304 can access the condition data 312 and/or the assistant data 306 in order to determine whether one or more conditions associated with the assistant response request 310 are satisfied. For example, at least one condition can be satisfied when a user that is different from the user 314 provides a spoken utterance that embodies subject matter associated with a temperature of the house in which the stand-alone computing device 318 is connected. Based on this particular condition being satisfied by the spoken utterance 326, the automated assistant can cause the stand-alone computing device 318 to render a natural language output 332 such as, "Because we are trying to save energy."

In some implementations, when the automated assistant 304 determines that a particular assistant query has been provided by one or more users on at least one or more occasions, the automated assistant 304 can determine whether the particular assistant query is capable of being resolved. For instance, the automated assistant 304 can determine whether the particular assistant query can be resolved using a response that is currently available to the automated assistant 304 and without further interaction with one or more users. When the automated assistant 304 is capable of resolving the assistant query, the automated assistant 304 can operate in furtherance of resolving the assistant query. However, when the automated assistant 304 determines that the automated assistant 304 is unable to resolve the assistant query without further user interaction (e.g., without asking the user how the automated assistant should respond), the automated assistant 304 can query the user regarding how to resolve the assistant query. In some implementations, however, although the automated assistant 304 can instantly resolve a particular assistant query, the user may specify a response that is different from a pre-configured response that the automated assistant 304 would otherwise provide. In some implementations, when the user specifies such a custom response, the automated assistant 304 can preface rendering of each of these particular custom responses with an indication of the particular user that established the custom response. Alternatively, or additionally, the automated assistant 304 can provide both the pre-configured response and the custom assistant response that the particular user specified.

In some implementations, an assistant response request from a user can indicate one or more conditions in which the automated assistant should provide, in response to a particular user query, a custom assistant response to a first user—but, a different custom assistant response to a second user that provides the particular user query. For example, the user can provide an assistant response request such as, "Assistant, when my son asks for the Wi-Fi password, please tell him the password for the 'Home' Wi-Fi network. But when a guest asks for the Wi-Fi password, please tell them the password for the 'Guest' Wi-Fi network." In response, the automated assistant can generate condition data that characterizes one or more conditions that should be satisfied in order to communicate the "Home" Wi-Fi password to someone, and one or more other conditions that should be satisfied in order to communicate the "Guest" Wi-Fi password.

For example, in some implementations, a condition for rendering the "Home" Wi-Fi password in response to a user query can include confirming that the user query was from the "son" of a primary account holder for the automated assistant. This identification can be confirmed using facial recognition, voice signature recognition, and/or any other process(es) for identifying a particular user. Alternatively, or additionally, a condition for rendering the "Guest" Wi-Fi password in response to a user query can include confirming that the user query was from a person that does not have certain permissions with respect to one or more accounts associated with the automated assistant. Alternatively, or additionally, the condition for providing the "Guest" Wi-Fi password in response to the user query can include confirming that a face, voice, or other unique feature of the user does not match that of another user that has a profile and/or account associated with the automated assistant.

In some implementations, a custom assistant response can be generated for certain queries that are similar but not exactly the same—at least with respect to their wording. For example, a user can create a custom assistant response for queries related to Wi-Fi passwords, and thereafter, any user queries related to Wi-Fi passwords can be answered according to the custom assistant response. In order to determine whether a particular user query is related to Wi-Fi passwords, or other subject matter, an embedding for the assistant response request can be compared with another embedding corresponding to an incoming user query. When a distance between the embedding and the other embedding, in embedding space, are determined to satisfy a threshold, the automated assistant can respond to the particular user query with a corresponding custom assistant response. Otherwise, when the threshold distance is not satisfied, the automated assistant can respond to the particular user query independent of the assistant response request established for the embedding and/or subject matter.

In some implementations, the user can specify a particular user query that the automated assistant should respond to using a custom assistant response. Furthermore, the automated assistant can request that the user specify similar user queries, in order to improve mappings of incoming queries to an embedding space. In response, the user can provide one or more additional spoken utterances that are similar to the particular user query, and the automated assistant can map those additional spoken utterances near the particular user query in the embedding space. Thereafter, when a user that is subject to the custom response provides a query that is within a threshold distance of the particular query and/or the additional spoken utterances in embedding space, the automated assistant can respond with the custom assistant response.

Figure 4:
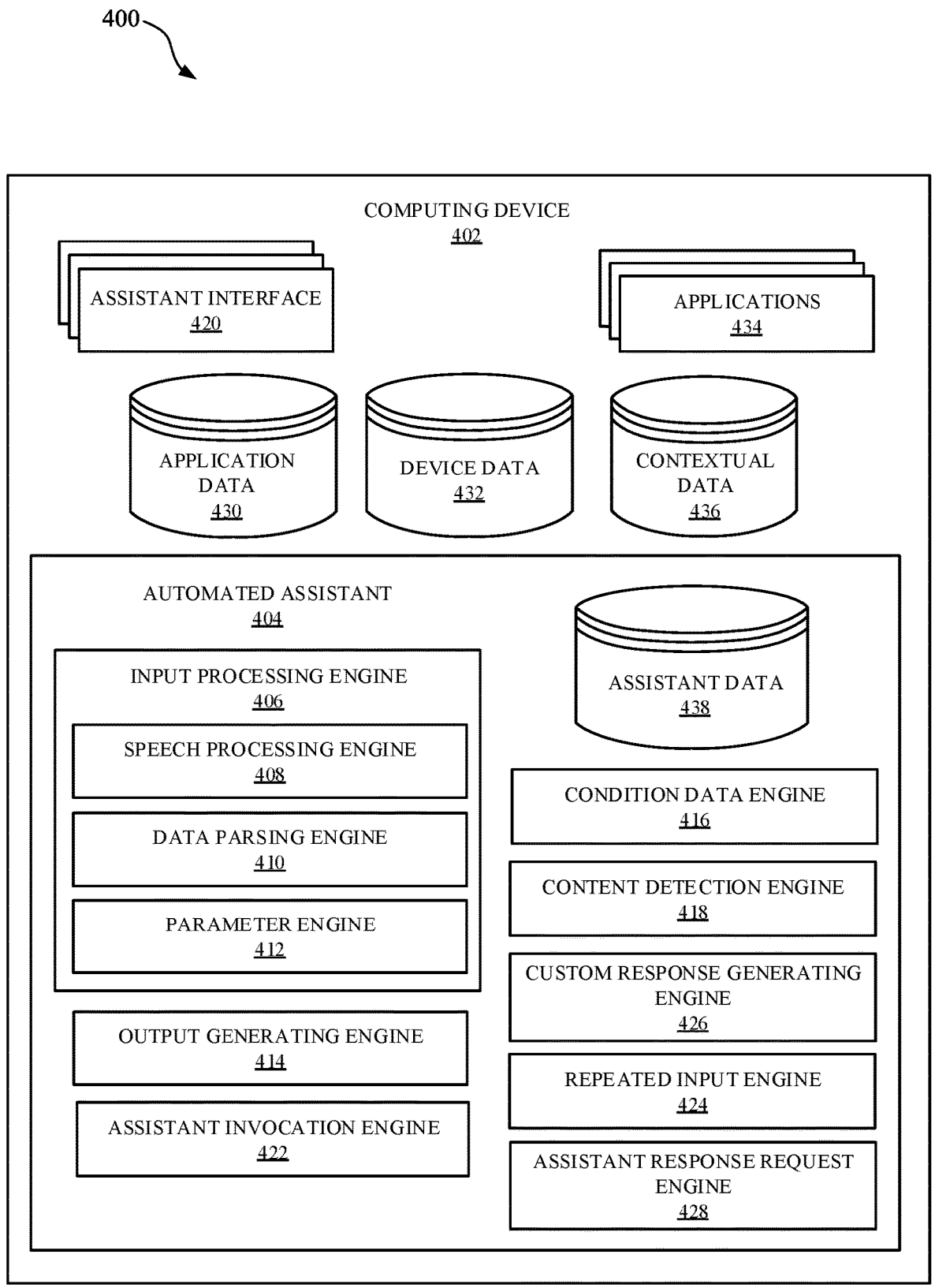
FIG. 4 illustrates a system for providing an automated assistant that is capable of providing user-specified custom assistant responses to assistant queries that the automated assistant may, or may not be, preconfigured to resolve.

FIG. 4 illustrates a system 400 that determines whether to offload computational tasks using network metrics that are not limited to signal strength, and that may be based on recent interactions between a user and an automated assistant 404. The automated assistant 404 can operate as part of an assistant application that is provided at one or more computing devices, such as a computing device 402 and/or a server device. A user can interact with the automated assistant 404 via assistant interface(s) 420, which can be a microphone, a camera, a touch screen display, a user interface, and/or any other apparatus capable of providing an interface between a user and an application. For instance, a user can initialize the automated assistant 404 by providing a verbal, textual, and/or a graphical input to an assistant interface 420 to cause the automated assistant 404 to initialize one or more actions (e.g., provide data, control a peripheral device, access an agent, generate an input and/or an output, etc.). Alternatively, the automated assistant 404 can be initialized based on processing of contextual data 436 using one or more trained machine learning models. The contextual data 436 can characterize one or more features of an environment in which the automated assistant 404 is accessible, and/or one or more features of a user that is predicted to be intending to interact with the automated assistant 404.

The computing device 402 can include a display device, which can be a display panel that includes a touch interface for receiving touch inputs and/or gestures for allowing a user to control applications 434 of the computing device 402 via the touch interface. In some implementations, the computing device 402 can lack a display device, thereby providing an audible user interface output, without providing a graphical user interface output. Furthermore, the computing device 402 can provide a user interface, such as a microphone, for receiving spoken natural language inputs from a user. In some implementations, the computing device 402 can include a touch interface and can be void of a camera, but can optionally include one or more other sensors.

The computing device 402 and/or other third party client devices can be in communication with a server device over a network, such as the internet. Additionally, the computing device 402 and any other computing devices can be in communication with each other over a local area network (LAN), such as a Wi-Fi network. The computing device 402 can offload computational tasks to the server device in order to conserve computational resources at the computing device 402. For instance, the server device can host the automated assistant 404, and/or computing device 402 can transmit inputs received at one or more assistant interfaces 420 to the server device. However, in some implementations, the automated assistant 404 can be hosted at the computing device 402, and various processes that can be associated with automated assistant operations can be performed at the computing device 402.

In various implementations, all or less than all aspects of the automated assistant 404 can be implemented on the computing device 402 (e.g., at a client computing device or a server computing device). Such implementations can be based on whether a response from the automated assistant 404 corresponds to data that is not stored at the client computing device and/or the response corresponds to an operation that should be performed by a separate computing device. In some of those implementations, aspects of the automated assistant 404 are implemented via the computing device 402 and can interface with a server device, which can implement other aspects of the automated assistant 404. The server device can optionally serve a plurality of users and their associated assistant applications via multiple threads. In implementations where all or less than all aspects of the automated assistant 404 are implemented via computing device 402, the automated assistant 404 can be an application that is separate from an operating system of the computing device 402 (e.g., installed "on top" of the operating system)—or can alternatively be implemented directly by the operating system of the computing device 402 (e.g., considered an application of, but integral with, the operating system).

In some implementations, the automated assistant 404 can include an input processing engine 406, which can employ multiple different modules for processing inputs and/or outputs for the computing device 402 and/or a server device. For instance, the input processing engine 406 can include a speech processing engine 408, which can process audio data received at an assistant interface 420 to identify the text embodied in the audio data. The audio data can be transmitted from, for example, the computing device 402 to the server device in order to preserve computational resources at the computing device 402. Additionally, or alternatively, the audio data can be exclusively processed at the computing device 402.

The process for converting the audio data to text can include a speech recognition algorithm, which can employ neural networks, and/or statistical models for identifying groups of audio data corresponding to words or phrases. The text converted from the audio data can be parsed by a data parsing engine 410 and made available to the automated assistant 404 as textual data that can be used to generate and/or identify command phrase(s), intent(s), action(s), slot value(s), and/or any other content specified by the user. In some implementations, output data provided by the data parsing engine 410 can be provided to a parameter engine 412 to determine whether the user provided an input that corresponds to a particular intent, action, and/or routine capable of being performed by the automated assistant 404 and/or an application or agent that is capable of being accessed via the automated assistant 404. For example, assistant data 438 can be stored at the server device and/or the computing device 402, and can include data that defines one or more actions capable of being performed by the automated assistant 404, as well as parameters necessary to perform the actions. The parameter engine 412 can generate one or more parameters for an intent, action, and/or slot value, and provide the one or more parameters to an output generating engine 414. The output generating engine 414 can use the one or more parameters to communicate with an assistant interface 420 for providing an output to a user, and/or communicate with one or more applications 434 for providing an output to one or more applications 434.

In some implementations, the automated assistant 404 can be an application that can be installed "on-top of" an operating system of the computing device 402 and/or can itself form part of (or the entirety of) the operating system of the computing device 402. The automated assistant application includes, and/or has access to, on-device speech recognition, on-device natural language understanding, and on-device fulfillment. For example, on-device speech recognition can be performed using an on-device speech recognition module that processes audio data (detected by the microphone(s)) using an end-to-end speech recognition machine learning model stored locally at the computing device 402. The on-device speech recognition generates recognized text for a spoken utterance (if any) present in the audio data. Also, for example, on-device natural language understanding (NLU) can be performed using an on-device NLU module that processes recognized text, generated using the on-device speech recognition, and optionally contextual data, to generate NLU data.

NLU data can include intent(s) that correspond to the spoken utterance and optionally parameter(s) (e.g., slot values) for the intent(s). On-device fulfillment can be performed using an on-device fulfillment module that utilizes the NLU data (from the on-device NLU), and optionally other local data, to determine action(s) to take to resolve the intent(s) of the spoken utterance (and optionally the parameter(s) for the intent). This can include determining local and/or remote responses (e.g., answers) to the spoken utterance, interaction(s) with locally installed application(s) to perform based on the spoken utterance, command(s) to transmit to internet-of-things (IoT) device(s) (directly or via corresponding remote system(s)) based on the spoken utterance, and/or other resolution action(s) to perform based on the spoken utterance. The on-device fulfillment can then initiate local and/or remote performance/execution of the determined action(s) to resolve the spoken utterance.

In various implementations, remote speech processing, remote NLU, and/or remote fulfillment can at least be selectively utilized. For example, recognized text can at least selectively be transmitted to remote automated assistant component(s) for remote NLU and/or remote fulfillment.

For instance, the recognized text can optionally be transmitted for remote performance in parallel with on-device performance, or responsive to failure of on-device NLU and/or on-device fulfillment. However, on-device speech processing, on-device NLU, on-device fulfillment, and/or on-device execution can be prioritized at least due to the latency reductions they provide when resolving a spoken utterance (due to no client-server roundtrip(s) being needed to resolve the spoken utterance). Further, on-device functionality can be the only functionality that is available in situations with no or limited network connectivity.

In some implementations, the computing device 402 can include one or more applications 434 which can be provided by a third-party entity that is different from an entity that provided the computing device 402 and/or the automated assistant 404. An application state engine of the automated assistant 404 and/or the computing device 402 can access application data 430 to determine one or more actions capable of being performed by one or more applications 434, as well as a state of each application of the one or more applications 434 and/or a state of a respective device that is associated with the computing device 402. A device state engine of the automated assistant 404 and/or the computing device 402 can access device data 432 to determine one or more actions capable of being performed by the computing device 402 and/or one or more devices that are associated with the computing device 402. Furthermore, the application data 430 and/or any other data (e.g., device data 432) can be accessed by the automated assistant 404 to generate contextual data 436, which can characterize a context in which a particular application 434 and/or device is executing, and/or a context in which a particular user is accessing the computing device 402, accessing an application 434, and/or any other device or module.

While one or more applications 434 are executing at the computing device 402, the device data 432 can characterize a current operating state of each application 434 executing at the computing device 402. Furthermore, the application data 430 can characterize one or more features of an executing application 434, such as content of one or more graphical user interfaces being rendered at the direction of one or more applications 434. Alternatively, or additionally, the application data 430 can characterize an action schema, which can be updated by a respective application and/or by the automated assistant 404, based on a current operating status of the respective application. Alternatively, or additionally, one or more action schemas for one or more applications 434 can remain static, but can be accessed by the application state engine in order to determine a suitable action to initialize via the automated assistant 404.

The computing device 402 can further include an assistant invocation engine 422 that can use one or more trained machine learning models to process application data 430, device data 432, contextual data 436, and/or any other data that is accessible to the computing device 402. The assistant invocation engine 422 can process this data in order to determine whether or not to wait for a user to explicitly speak an invocation phrase to invoke the automated assistant 404, or consider the data to be indicative of an intent by the user to invoke the automated assistant—in lieu of requiring the user to explicitly speak the invocation phrase. For example, the one or more trained machine learning models can be trained using instances of training data that are based on scenarios in which the user is in an environment where multiple devices and/or applications are exhibiting various operating states. The instances of training data can be generated in order to capture training data that characterizes contexts in which the user invokes the automated assistant and other contexts in which the user does not invoke the automated assistant.

When the one or more trained machine learning models are trained according to these instances of training data, the assistant invocation engine 422 can cause the automated assistant 404 to detect, or limit detecting, spoken invocation phrases from a user based on features of a context and/or an environment, and/or a non-verbal activity of the user. Additionally, or alternatively, the assistant invocation engine 422 can cause the automated assistant 404 to detect, or limit detecting for one or more assistant commands from a user based on features of a context and/or an environment. In some implementations, the assistant invocation engine 422 can be disabled or limited based on the computing device 402 detecting an assistant suppressing output from another computing device. In this way, when the computing device 402 is detecting an assistant suppressing output, the automated assistant 404 will not be invoked based on contextual data 436—which would otherwise cause the automated assistant 404 to be invoked if the assistant suppressing output was not being detected.

In some implementations, the automated assistant 404 can include an assistant response request engine 428 that can determine whether an input to the automated assistant 404 includes an assistant response request. For example, the assistant response request 428 can determine that a particular user has requested that the automated assistant 404 respond to certain assistant queries from another user by providing a particular assistant response. In some implementations, the automated assistant 404 can determine whether the particular user that provided the assistant response request has permission to provide assistant response requests. Alternatively, or additionally the assistant response request engine 428 can determine whether the particular user that provided the assistant response request has permission to establish a custom assistant response for the other user. Alternatively, or additionally the assistant response request engine 428 can determine whether the particular user has permission to establish a custom assistant response that is associated with the subject matter identified in the assistant response request.

When the particular user is determined to be permitted to create the custom assistant response (e.g., based on permission data stored with the assistant data 438), the condition data engine 416 can generate condition data that characterizes one or more conditions based on the assistant response request. The one or more conditions, when satisfied, can cause the automated assistant 404 to provide a particular response. For instance, when a child asks "What's my bedtime?" the automated assistant 404 can respond with a natural language output specified by another user (e.g., a parent of the child). In some implementations, the automated assistant 404 can include a custom response generating engine 426 for generating data that characterizes a custom assistant response that is adapted according to certain application data 430, device data 432, and/or contextual data 436. For example, depending on when a child provides the query "When is my bedtime," custom response generating engine 426 can adapt the custom assistant response based on a current context and/or a current user activity. For instance, when the "bedtime" is 20 minutes away, the automated assistant 404 can adapt the custom assistant response to be "In 20 minutes," instead of "8:00 PM," thereby providing a response that is more readily interpreted and/or actionable by a recipient.

In some implementations, in order for the condition data engine 416 to determine whether a particular condition has been satisfied, the automated assistant 404 can include a content detection engine 418. The content detection engine 418 can determine whether content of one or more spoken utterances and/or other inputs to the computing device 402 or another computing device satisfies a particular condition for an assistant response request. For example, a condition can be whether a particular user provided a query, whether certain subject matter is embodied in the query, whether the query was provided at a particular time and/or place, whether an amount of time has transpired since the assistant response request was provided, and/or any other condition that can be associated with an automated assistant response.

In some implementations, the automated assistant 404 can include a repeated input engine 424, which can process assistant data 438 and/or condition data engine 416 in order to determine whether a particular input is a repeated input. For example, the repeated input engine 424 can determine whether a particular user input to the automated assistant 404 is similar to a previous input provided to the automated assistant 404 by the same particular user or a different user. Furthermore, the repeated input engine 424 can determine whether the automated assistant 404 has been able to resolve the repeated input without further interaction with a user. When the repeated input engine 424 determines that the automated assistant 404 has not been able to resolve the repeated input, the assistant response request engine 428 can generate a query for the user. The query generated by the assistant response request engine 428 can correspond to a request for a user to provide a user-specified assistant response for the repeated input. In some implementations, the user selected to receive the request can be a user with particular administrative privileges for the automated assistant and/or a user that is most correlated to the particular request (e.g., the repeated inquiries are associated with an item owned by a particular user who will be the target for the request). When the user provides a user-specified assistant response, the condition data engine 416 can generate condition data that characterizes one or more conditions (e.g., one or more users providing the repeated input) that should be satisfied in order for the automated assistant 404 to provide the user-specified assistant response.

Figure 5A:
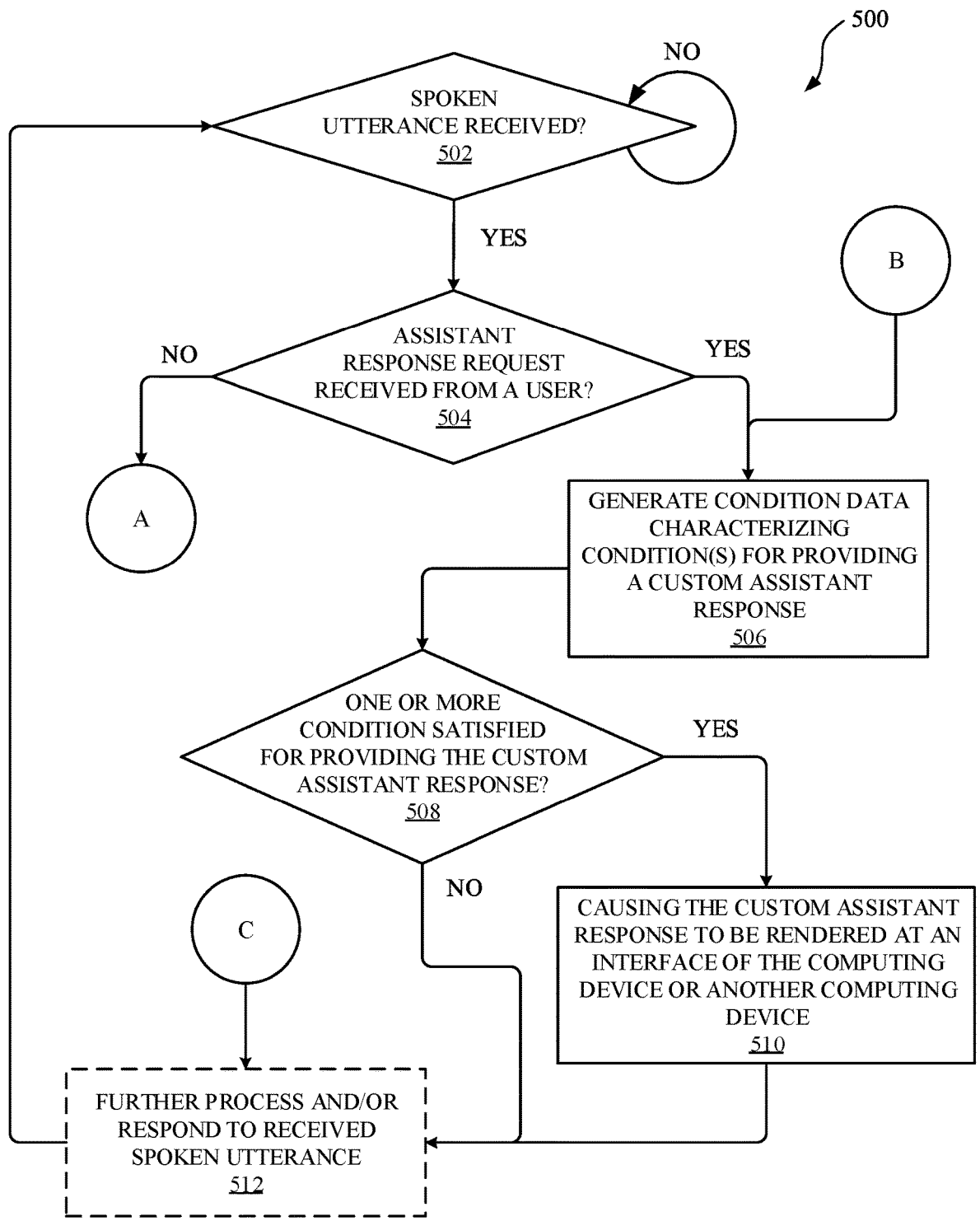
FIG. 5A and FIG. 5B illustrate methods for creating a custom assistant response for an automated assistant to provide when certain conditions are satisfied.
Figure 5B:
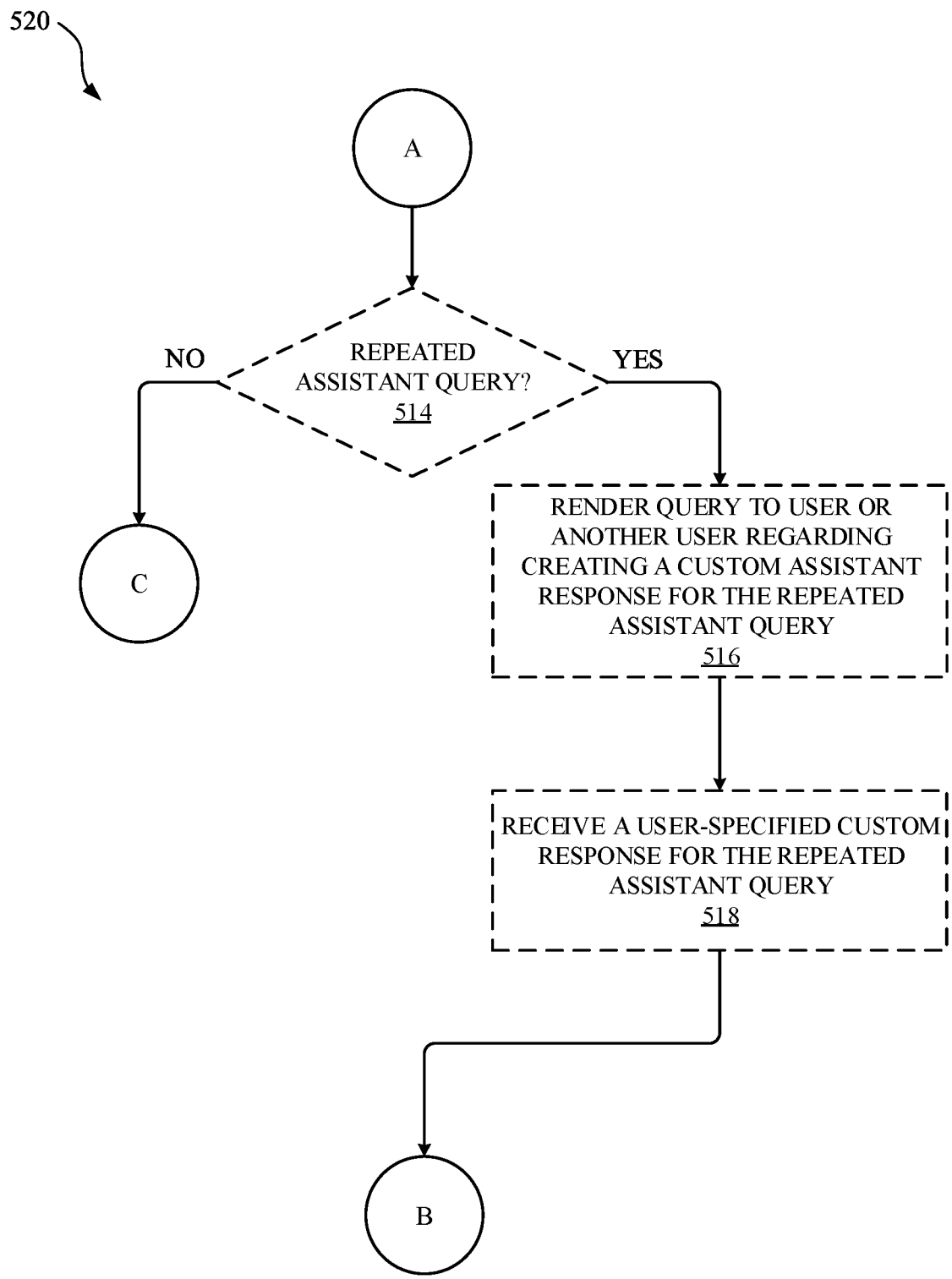

FIG. 5A and FIG. 5B illustrate a method 500 and a method 520 for creating a custom assistant response for an automated assistant to provide when certain conditions are satisfied. The method 500 and the method 520 can be performed by one or more applications, computing devices, and/or any other apparatus or module capable of providing access to an automated assistant. The method 500 can include an operation 502 of determining whether a spoken utterance has been received by an automated assistant. For example, the automated assistant can be responsive to spoken natural language input from one or more users. When a spoken utterance is received by the automated assistant, the method 500 can proceed to an operation 504. Otherwise, the automated assistant can continue to determine whether one or more users have provided a natural language input to the automated assistant.

The operation 504 can include determining whether an assistant response request has been received from a user. In other words, the automated assistant can determine whether the spoken utterance received from a user embodies a request for the automated assistant to provide a custom response when one or more conditions are satisfied. For example, a spoken utterance that embodies an assistant response request can be, but is not limited to, "When Jack comes back inside, ask him whether he finished his homework."

When the automated assistant determines that an assistant response request was received from a user, the method 500 can proceed from the operation 504 to an operation 506. Otherwise, the method 500 can proceed from the operation 504, via continuation element "A" to an operation 514, provided in method 520 of FIG. 5B. The operation 506 can include generating condition data characterizing conditions for providing a custom assistant response. For example, the automated assistant can determine that the custom assistant response specified by the user is asking the user Jack "whether he finished his homework." Additionally, the automated assistant can generate condition data characterizing a condition that the user Jack should come inside of the home in order for the automated assistant to provide the custom assistant response. This condition can be satisfied in response to processing certain data, such as data from one or more sensors that are accessible to the automated assistant. For instance, and with prior permission from Jack, one more machine learning models can be used to process video data and/or other image data to determine whether Jack has relocated from outside of the home to inside the home.

The method 500 can proceed from the operation 506 to an operation 508 that includes determining whether one or more conditions have been satisfied for providing the custom assistant response. When the one or more conditions have been satisfied, the method 500 can proceed to an operation 510 of causing the custom assistant response to be rendered at an interface of the computing device or another computing device. For instance, and in accordance with the aforementioned example, the automated assistant can determine that the user Jack has returned to inside of the home after having been outside of the home. In response to making this determination, the automated assistant can cause an interface of a computing device to provide an audible natural language output such as, "Hi Jack, did you finish your homework?"

When the one or more conditions are not satisfied, the method 500 can proceed from the operation 508 to an operation 512. Alternatively, or additionally, the method 500 can proceed from the operation 510 to the operation 512, which can be an optional operation. For example, in some implementations, the automated assistant can determine whether the user that received any custom assistant response responded to the custom assistant response. In response to this user responding to the custom assistant response, the automated assistant can further process and/or respond to the received spoken utterance, as indicated in operation 512. The automated assistant can, for example, communicate the response from this user to the user that originated the assistant response request. Alternatively, or additionally, the automated assistant can respond to this user when appropriate. Alternatively, or additionally, when the spoken utterance that is received at the operation 502 does not include an assistant response request, the method 500 can eventually proceed to the optional operation 512, in which further processing can be performed on the spoken utterance.

For example, when an assistant response request is not detected in the spoken utterance received at the operation 502, the method 504 can proceed to the operation 514 via continuation element "A." The operation 514, of the method 520, can include determining whether the spoken utterance embodies a repeated assistant query. For example, a repeated assistant query can be a query that includes subject matter that has been previously provided in another assistant query directed to the automated assistant. For instance, in some households, the automated assistant can repeatedly receive an assistant query such as, "Assistant, when is my bedtime?" Although the automated assistant may have a default response (e.g., "I'm sorry, but you may try asking this question in another way.") when such assistant queries cannot be resolved without further user interaction, such user interactions can waste computational resources. In order to overcome this limitation, the automated assistant can prompt a particular user(s) regarding how to respond to this repeated assistant query.

For example, the automated assistant can render a query to a particular user regarding creating a custom assistant response for the repeated assistant query. The query that is rendered to the particular user can be, for example, "I have received multiple queries asking when bedtime is. How should I respond?" In response, this particular user can provide a response such as, "Bedtime is at 8 PM." When the particular user provides this response, the method 520 can proceed to the operation 518, in which the automated assistant receives a user-specified custom response for the repeated assistant query. Thereafter, the method 520 can proceed from the operation 518, via continuation element "B," to the operation 506 of the method 500. In this way, condition data can be generated for establishing conditions that, when satisfied, cause the automated assistant to provide the user-specified custom response. For instance, a condition of providing the user specified custom response can be satisfied when (i) subject matter of an assistant query includes bedtime and/or (ii) the person(s) that provided the assistant query is a child (e.g., the person(s) is within a particular age range) and/or exhibits any other feature(s) that is detectable via one or more sensors. Thereafter, the automated assistant can determine whether one or more conditions are satisfied for providing the user specified custom response and/or the method 500 can return to the operation 502.

Figure 6:
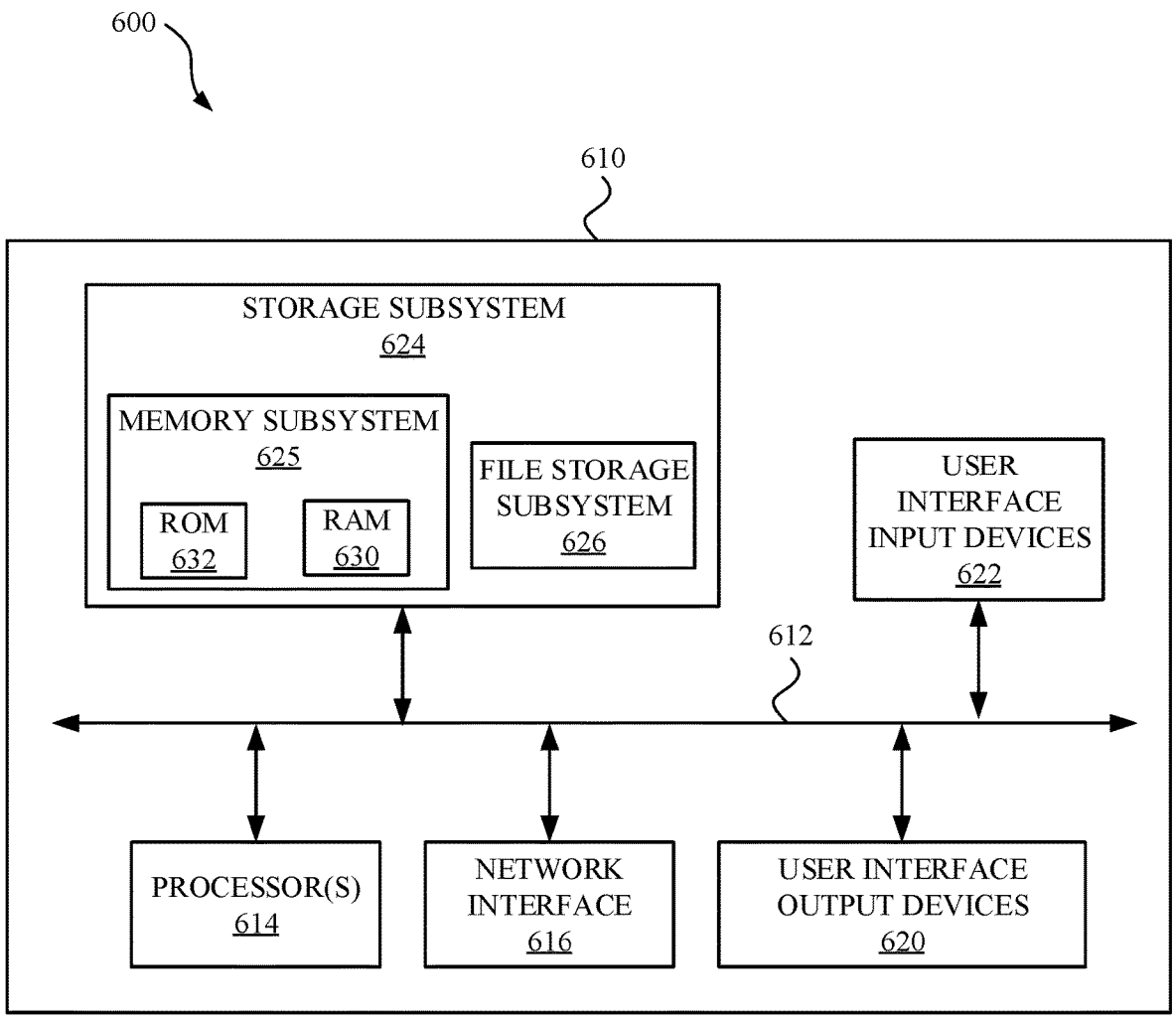
FIG. 6 is a block diagram of an example computer system.

FIG. 6 is a block diagram 600 of an example computer system 610. Computer system 610 typically includes at least one processor 614, which communicates with a number of peripheral devices via bus subsystem 612. These peripheral devices may include a storage subsystem 624, including, for example, a memory 625 and a file storage subsystem 626, user interface output devices 620, user interface input devices 622, and a network interface subsystem 616. The input and output devices allow user interaction with computer system 610. Network interface subsystem 616 provides an interface to outside networks and is coupled to corresponding interface devices in other computer systems.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 610 to the user or to another machine or computer system.

Storage subsystem 624 stores programming and data constructs that provide the functionality of some or all of the modules described herein. For example, the storage subsystem 624 may include the logic to perform selected aspects of method 500, and/or to implement one or more of system 400, computing device 302, computing device 202, computing device 102, and/or any other application, device, apparatus, and/or module discussed herein.

These software modules are generally executed by processor 614 alone or in combination with other processors. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computer system 610 communicate with each other as intended. Although bus subsystem 612 is shown schematically as a single bus, alternative implementations of the bus subsystem may use multiple busses.

Computer system 610 can be of varying types including a workstation, server, computing cluster, blade server, server farm, or any other data processing system or computing device. Due to the ever-changing nature of computers and networks, the description of computer system 610 depicted in FIG. 6 is intended only as a specific example for purposes of illustrating some implementations. Many other configurations of computer system 610 are possible having more or fewer components than the computer system depicted in FIG. 6.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

In some implementations, a method implemented by one or more processors is set forth as including operations such as receiving, at an interface of a computing device, a spoken utterance from a first user, wherein the computing device provides access to an automated assistant that is responsive to natural language input. The method can further include an operation of determining, based on the spoken utterance, that an assistant response request is embodied in the spoken utterance, wherein the assistant response request is a request for the automated assistant to provide a custom response when one or more assistant response conditions are satisfied, and wherein the one or more assistant response conditions are satisfied based on one or more actions of a second user that is different from the first user. The method can further include an operation of generating condition data characterizing the one or more assistant response conditions that, when satisfied, causes the automated assistant to provide the custom response. The method can further include an operation of determining, subsequent to generating the condition data, whether the one or more assistant response conditions are satisfied. The method can further include an operation of, when the one or more assistant response conditions are determined to be satisfied: causing the custom response to be rendered at the computing device or another computing device.

In some implementations, the one or more actions of the second user include a voice input from the second user to the automated assistant, and determining whether the one or more assistant response conditions are satisfied includes: determining whether a voice signature of the second user is embodied in the voice input from the second user. In some implementations, the voice input includes a user query that was provided by the second user during a previous interaction between the second user and the automated assistant, and during the previous interaction, the automated assistant provided a separate response that is different than the custom response. In some implementations, the one or more actions of the second user include an input from the second user to the automated assistant, and determining whether the one or more assistant response conditions are satisfied includes: determining whether a particular subject matter is embodied in the input from the second user. In some implementations, the method can further include an operation of, when the one or more assistant response conditions are determined to be satisfied: determining a context in which the one or more assistant response conditions are satisfied, wherein causing the custom response to be rendered at the interface of the computing device or another computing device includes: causing the custom response to be paraphrased based on the context.

In some implementations, the one or more actions of the second user include a non-verbal activity of the second user over a period of time, and determining whether the one or more assistant response conditions are satisfied includes: determining whether the second user performed the non-verbal activity. In some implementations, determining whether the second user performed the non-verbal activity includes: processing image data captured at the computing device or another computing device using one or more trained machine learning models, wherein the one or more trained machine learning models are trained using training data that is generated based on one or more previous instances in which the second user or another user performed the non-verbal activity. In some implementations, determining whether the one or more assistant response conditions are satisfied includes: processing, using one or more trained machine learning models, audio data characterizing a particular spoken utterance from the second user to determine whether the particular spoken utterance is from a particular type of user or whether the particular spoken utterance includes a particular type of query.

In some implementations, the particular type of user is a child. In some implementations, determining the assistant response request is embodied in the spoken utterance includes: processing, using one or more trained machine learning models, audio data characterizing the spoken utterance from the first user to identify each assistant response condition of the one or more assistant response conditions to be satisfied before providing the custom response. In some implementations, the method can further include an operation of determining, based on the assistant response request, that permission data associated with the automated assistant indicates that the first user is permitted to establish the custom response for the second user. In some implementations, the method can further include an operation of determining, based on the assistant response request, that permission data associated with the automated assistant indicates that the first user is permitted to establish the custom response for the one or more assistant response conditions, wherein the one or more assistant response conditions include a particular subject matter being embodied in an input from the second user. In some implementations, the method can further include an operation of determining, in response to determining that the assistant response request is embodied in the spoken utterance, whether the assistant response request corresponds to a particular user query that the automated assistant is preconfigured to resolve, wherein, when the assistant response request corresponds to the particular user query, the automated assistant renders an indication that the custom response is different from a preconfigured response for the particular user query.

In other implementations, a method implemented by one or more processors is set forth as including operations such as receiving, at an interface of a computing device, a spoken utterance from a first user, wherein the computing device provides access to an automated assistant that is responsive to natural language input. The method can further include an operation of determining, based on the spoken utterance, whether the spoken utterance corresponds to an assistant response request previously provided by a second user that is different from the first user, wherein the assistant response request is a request for the automated assistant to provide a custom response when one or more assistant response conditions are satisfied, and wherein the one or more assistant response conditions are satisfied based on one or more actions of the first user. The method can further include an operation of determining, based on the assistant response request, that the one or more assistant response conditions for the assistant response request are satisfied. The method can further include an operation of causing, in response to determining that the one or more assistant response conditions are satisfied, the custom response to be rendered at the computing device or another computing device.

In some implementations, the method can further include an operation of, subsequent to causing the custom response to be rendered at the interface: determining whether the first user provided a user response to the automated assistant in response to the custom response, and when the first user is determined to have provided the user response to the automated assistant: generating responsive input data characterizing the user response provided by the first user to the automated assistant. In some implementations, the method can further include an operation of, subsequent to causing the custom response to be rendered at the interface and when the first user is determined to have provided the user response to the automated assistant: causing the computing device or another computing device to render output data, for the second user, based on the responsive input data.

In yet other implementations, a method implemented by one or more processors is set forth as including operations that include determining, at a computing device that is accessible to multiple different users, that one or more users of the multiple different users have provided a common query to an automated assistant available at the computing device. The method can further include an operation of causing, based on the common query, a user query to be provided by the automated assistant to a particular user of the multiple different users, wherein the user query corresponds to a request for the particular user to specify a custom assistant response for the common query. The method can further include an operation of receiving, in response to the user query, a spoken utterance from the particular user, wherein the spoken utterance embodies the custom assistant response for the automated assistant to provide in response to the automated assistant receiving the common query. The method can further include an operation of generating, in response to the spoken utterance from the particular user, assistant response condition data, wherein the assistant response condition data characterizes one or more conditions to be satisfied before the automated assistant provides the custom assistant response specified by the particular user.

In some implementations, the one or more conditions are satisfied when one or more of the different users provides the common query, and the method further comprises: subsequent to generating the assistant response condition data: receiving, by the automated assistant, an additional spoken utterance from the one or more users of the multiple different users, wherein the additional spoken utterance embodies the common query. In some implementations, the method can further include an operation of causing, in response to receiving the additional spoken utterance, the computing device or another computing device to provide the custom assistant response. In some implementations, the additional spoken utterance is provided by an additional user of the multiple different users, and the particular user that provided the spoken utterance is different from the additional user. In some implementations, the one or more users include persons within a particular age range, and wherein the one or more conditions are satisfied when the persons within the particular age range provide the common query.

We claim:

1. A method implemented by one or more processors, the method comprising:
   receiving, at an interface of a computing device, a spoken utterance from a first user,
      wherein the computing device provides access to an automated assistant that is responsive to natural language input;
   determining, based on the spoken utterance, that an assistant response request is embodied in the spoken utterance,
      wherein the assistant response request is a request for the automated assistant to provide a custom response when one or more assistant response conditions are satisfied, the one or more assistant response conditions comprising receiving a spoken assistant query that embodies particular subject matter, and
      wherein the one or more assistant response conditions are satisfied based on one or more actions of a second user that is different from the first user;
   generating condition data characterizing the one or more assistant response conditions that, when satisfied, causes the automated assistant to provide the custom response;
   subsequent to generating the condition data:
      receiving, at an additional interface of an additional computing device, an additional spoken utterance from the second user;
      determining, based on processing the additional spoken utterance, that the one or more assistant response conditions are satisfied, wherein determining, based on processing the additional spoken utterance, that the one or more assistant response conditions are satisfied comprises determining that the additional spoken utterance embodies the particular subject matter;
   in response to receiving the additional spoken utterance:
      causing a pre-configured response to the additional spoken utterance to be rendered to the second user at the additional computing device at which the additional spoken utterance was received, and
      causing the custom response to be rendered to the second user at the additional computing device before or after rendering of the pre-configured response, wherein causing the custom response to be rendered before or after rendering of the pre-configured response is in response to determining that the one or more assistant response conditions are satisfied.

2. The method of claim 1, wherein determining that the one or more assistant response conditions are satisfied further includes:
   determining a voice signature of the second user is embodied in the additional spoken utterance from the second user.

3. The method of claim 1, further comprising:
   when the one or more assistant response conditions are determined to be satisfied:
      determining a context in which the one or more assistant response conditions are satisfied,
         wherein causing the custom response to be rendered to the second user at the additional computing device includes:

causing the custom response to be paraphrased based on the context.

4. The method of claim 1, further comprising:
determining, based on the assistant response request, that permission data associated with the automated assistant indicates that the first user is permitted to establish the custom response for the second user.

5. The method of claim 1, wherein causing the custom response to be rendered comprises causing the custom response to be rendered with an indication that the custom response is different from the pre-configured response, wherein the indication that the custom response is different from the pre-configured response includes prefacing of rendering, of the custom response, with an indication that the first user established the custom response.

6. The method of claim 1, wherein causing the custom response to be rendered comprises causing the custom response to be rendered with an indication that the custom response is different from the pre-configured response by audibly rendering the pre-configured response in a first voice and audibly rendering the custom response in a distinct second voice.

7. A method implemented by one or more processors, the method comprising:
receiving, at an interface of a computing device, a spoken utterance from a first user,
wherein the computing device provides access to an automated assistant that is responsive to natural language input;
determining, based on subject matter embodied by the spoken utterance, whether the spoken utterance corresponds to an assistant response request previously provided by a second user that is different from the first user;
wherein the assistant response request is a request for the automated assistant to provide a custom response when one or more assistant response conditions are satisfied, and
wherein the one or more assistant response conditions are satisfied based on determining that the subject matter, embodied by the spoken utterance, includes particular subject matter;
determining, based on the assistant response request, that the one or more assistant response conditions for the assistant response request are satisfied; and
in response to receiving the spoken utterance:
causing a pre-configured response to the spoken utterance to be rendered to the first user at the computing device, and
causing, further in response to determining that the one or more assistant response conditions are satisfied, the custom response to be rendered to the first user at the computing device before or after rendering of the pre-configured response.

8. The method of claim 7, further comprising:
subsequent to causing the custom response to be rendered to the first user at the computing device:
determining whether the first user provided a user response to the automated assistant in response to the custom response, and
when the first user is determined to have provided the user response to the automated assistant:
generating responsive input data characterizing the user response provided by the first user to the automated assistant.

9. The method of claim 8, further comprising:
subsequent to causing the custom response to be rendered to the first user at the computing device and when the first user is determined to have provided the user response to the automated assistant:
causing the computing device or another computing device to render output data, for the second user, based on the responsive input data.

10. The method of claim 7, wherein causing the custom response to be rendered comprises causing the custom response to be rendered with an indication that the custom response is different from the pre-configured response, wherein the indication that the custom response is different from the pre-configured response includes prefacing of rendering, of the custom response, with an indication that the second user established the custom response.

11. A method implemented by one or more processors, the method comprising:
determining, at a computing device that is accessible to multiple different users, that one or more users of the multiple different users have provided a common query to an automated assistant available at the computing device;
causing, based on the common query, a user query to be provided by the automated assistant to a particular user of the multiple different users,
wherein the user query corresponds to a request for the particular user to specify a custom assistant response for the common query;
receiving, in response to the user query, a spoken utterance from the particular user,
wherein the spoken utterance embodies the custom assistant response for the automated assistant to provide in response to the automated assistant receiving the common query; and
generating, in response to the spoken utterance from the particular user, assistant response condition data,
wherein the assistant response condition data characterizes one or more conditions to be satisfied before the automated assistant provides the custom assistant response specified by the particular user.

12. The method of claim 11, wherein the one or more conditions are satisfied when one or more of the different users provides the common query, and the method further comprises:
subsequent to generating the assistant response condition data:
receiving, by the automated assistant, an additional spoken utterance from an additional user of the multiple different users,
wherein the additional spoken utterance embodies the common query; and
causing, in response to receiving the additional spoken utterance, the computing device or another computing device to provide the custom assistant response.

13. The method of claim 12,
wherein the particular user that provided the spoken utterance is different from the additional user.

14. The method of claim 11, wherein the one or more users include persons within a particular age range, and wherein the one or more conditions are satisfied when the persons within the particular age range provide the common query.

* * * * *